Feb. 28, 1956
C. M. MARTIN
2,736,568
UTILITY OR BOAT TRAILER AND WHEEL SUSPENSION THEREFOR
Filed Aug. 7, 1953
2 Sheets-Sheet 1
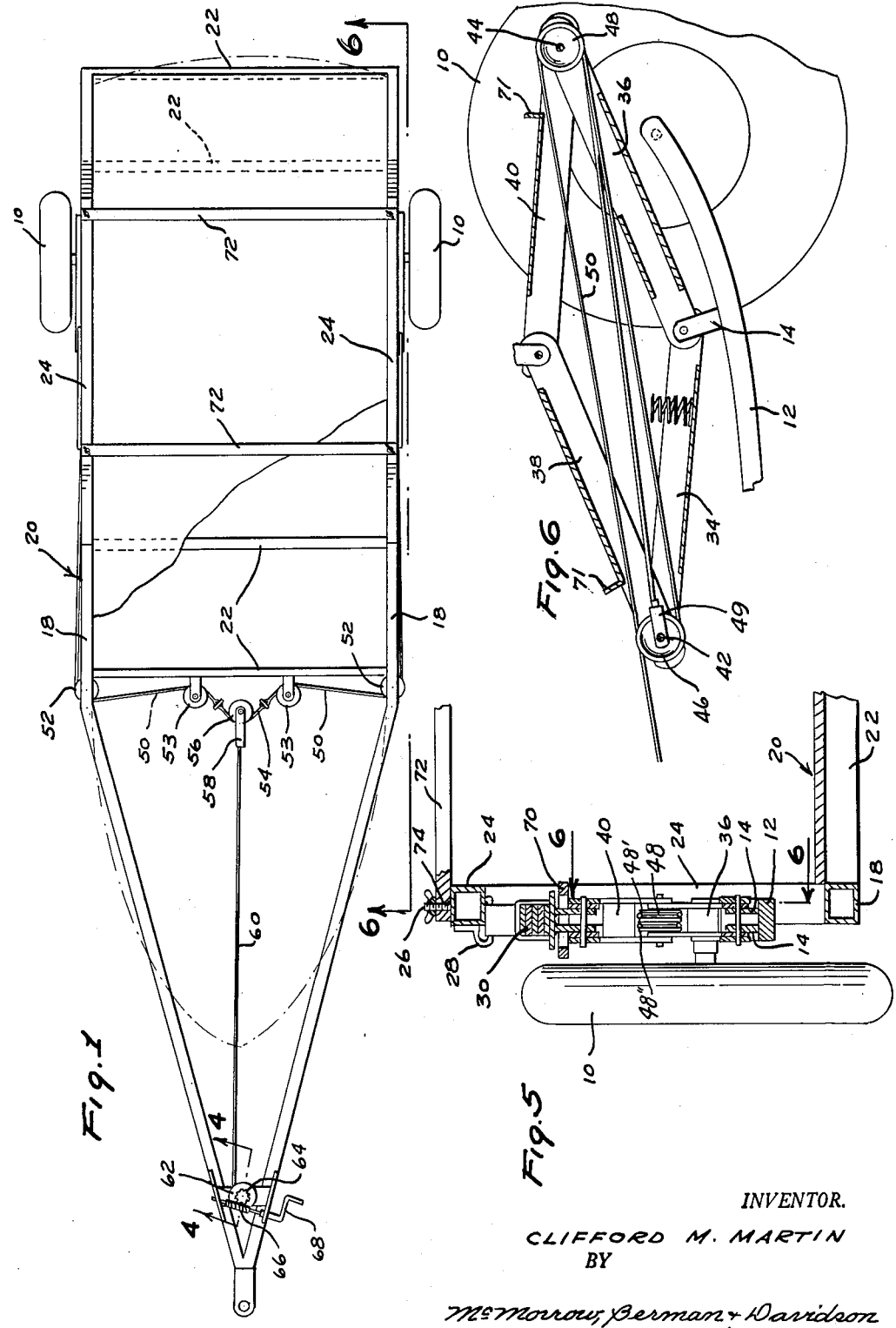
INVENTOR.
CLIFFORD M. MARTIN
BY
McMorrow, Berman + Davidson
ATTORNEYS Feb. 28, 1956 C. M. MARTIN 2,736,568
UTILITY OR BOAT TRAILER AND WHEEL SUSPENSION THEREFOR
Filed Aug. 7, 1953 2 Sheets-Sheet 2
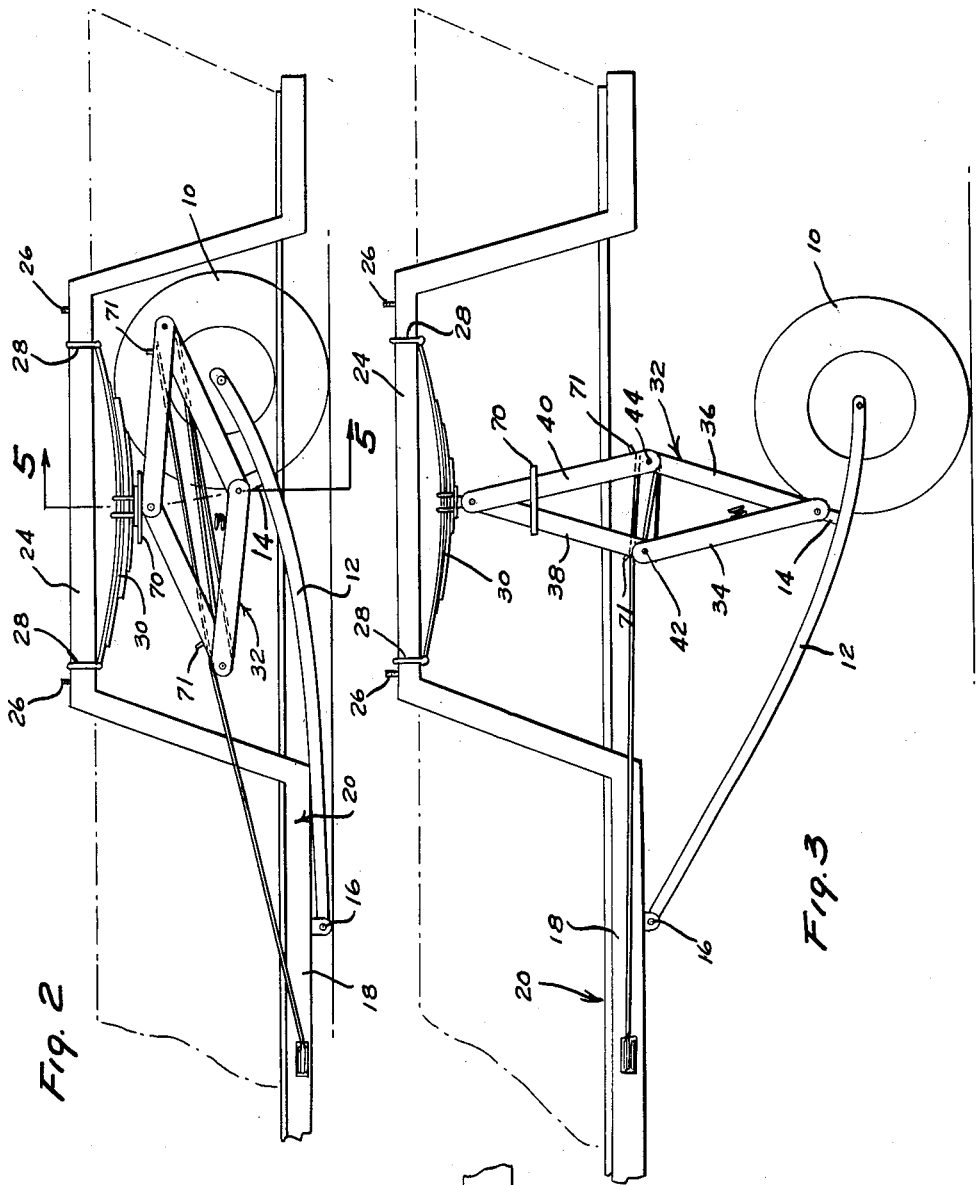
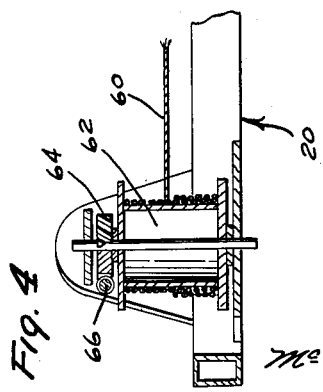
INVENTOR.
CLIFFORD M. MARTIN
BY
McMorrow, Berman & Davidson
ATTORNEYS

United States Patent Office

2,736,568
UTILITY OR BOAT TRAILER AND WHEEL SUSPENSION THEREFOR

Clifford M. Martin, Grand Rapids, Mich.

Application August 7, 1953, Serial No. 373,028

2 Claims. (Cl. 280—44)

This invention relates to a trailer and the wheel suspension therefor and has for its primary object to facilitate the loading, transportation and unloading of a boat or the like from the trailing vehicle.

Another object is to support the trailer on springs in order to prevent the transmission of road shocks to the load supported on the trailer.

A further object is to enable the trailer frame to be lowered substantially to the ground in order to facilitate the disposition of a load thereon and also to hold the load against side slip during its transportation.

Still another object is to produce a trailing vehicle that allows the weight of the trailer frame, and load thereon, to be suspended sufficiently below the springs so that centrifugal force, encountered when turning, will not produce an outside springroll.

The above and other objects may be attained by employing this invention which embodies among its features a pair of spaced ground wheels mounted to rotate about a common axis, arms carried by the ground wheels for movement about the common axis, a trailer frame carried by the arms for movement therewith from a lowered position in which it lies below the common axis to a position in which it lies above the tops of the ground wheels, and inverted U-shaped ground wheel control mechanism receiving pockets carried by the trailer frame adjacent opposite sides thereof and defining abutments for engaging opposite sides of a boat mounted on the trailer frame.

Other features include extensible means carried by the arms and operatively connected to the trailer frame for elevating the trailer frame above the ground wheels and means carried by the trailer frame and operatively connected to the extensible means for controlling the movements thereof.

Still other features include a toggle carried by the arms and operatively connected to the trailer frame for elevating said frame, and a loop carried by the toggle and adapted to encircle it in contacting relation thereto to hold the toggle against collapsing movement after the frame has been elevated.

Still further features include extensible means carried by the toggle and extending between the knee joints thereof for controlling the raising and lowering of the trailer frame by the toggle, and means carried by the trailer frame remote from the ground wheels and operatively connected with the extensible means for controlling its movements.

In the drawings:

Figure 1 is a plan view of a boat trailer embodying the features of this invention;

Figure 2 is a fragmentary side view on a slightly enlarged scale showing the trailer frame lowered into boat receiving position;

Figure 3 is a view similar to Figure 2, showing the frame elevated;

Figure 4 is an enlarged fragmentary sectional view taken substantialy on the line 4—4 of Figure 1;

Figure 5 is an enlarged fragmentary sectional view taken substantially on the line 5—5 of Figure 2; and Figure 6 is a fragmentary enlarged sectional view taken substantially on the line 6—6 of Figure 1.

Referring to the drawings in detail, a pair of spaced parallel ground wheels 10 are mounted on spaced arms 12 to rotate about a common axis. These arms may take the form of conventional wheel forks between opposite tines of which the wheels 10 are mounted to rotate, and carried by the arms 12 adjacent the peripheries of the wheels 10 are upwardly extending ears 14 to which the extensible means, to be more fully hereinafter described, is pivotally coupled.

Connected as by downwardly extending ears 16 to the arms 12 remote from the wheels 10 are the side bars 18 of the boat trailer frame designated generally 20. The side bars 18 are held in spaced parallel relation by cross bars 22 and formed intermediate the ends of the side bars 18 are upwardly extending inverted U-shaped portions 24 defining pockets in which the wheel control mechanisms are received when the frame 20 is lowered into load receiving position, as illustrated in Figure 2. These upwardly extending inverted U-shaped portions 24 also define abutments adjacent opposite sides of the frame 10 which engage opposite sides of a boat, substantially as illustrated by the broken lines in Figure 2, to confine the boat against lateral movement. Carried by and extending upwardly from each inverted U-shaped portion adjacent the forward and rear ends thereof are externally screw-threaded studs 26, the purpose of which will be more fully hereinafter described. Encircling the top bar of each inverted U-shaped portion 24 are yokes 28 which are disposed adjacent opposite ends of said top bar and support thereon a leaf spring 30 which, as illustrated in the drawings, extends downwardly beneath each top bar forming the cushioning springs which are disposed between the frame 20 and the wheels 10.

Pivotally connected to the upstanding member 14 on each arm 12 and to the underside of each spring 30 is an extensible member designated generally 32 which in the present construction comprises a toggle composed of pairs of oppositely moving lower links 34 and 36 and pairs of oppositely moving upper links 38 and 40. The upper ends of the pairs of links 34 and 36 are pivotally connected as at 42 and 44 to the pairs of upper links 38 and 40 to form oppositely moving toggle means. Carried by the pivots 42 and 44 are pulley 46 and double pulley 48 respectively around which are trained flexible members 50 which are carried forwardly along opposite sides of the frame 20 and adjacent the side bars 18 to pulleys 52 carried by the frame adjacent the forward ends of the side bars 18. Selected ends of these flexible members 50 are secured to yokes 49 carried by the pivots 42 and the flexible members 50 are then trained over the pulleys 48 and 46 and thence over guide pulleys 53 mounted on the front cross bar 22. Hence, each flexible member 50 is anchored at one selected end to a yoke 49, then trained about one of the pulleys 48' of the double pulley 48, then trained around the pulleys 46 and then back around the other pulley 48" of the pulley 48 to be then trained over the adjacent guide pulley 53. It will thus be seen that when pull is exerted on the flexible members 50, the knees of the toggles will be moved toward one another to elevate the frame 20.

As illustrated in Figure 1, the ends of the flexible members 50 remote from the toggles are connected together by a cable 54 and engaging said cable 54 is a pulley 56 which is carried by a yoke 58 which is coupled to the longitudinally extending cable 60 which, as illustrated in Figure 1, is wound on a windlass 62 carried by the frame 20 adjacent the forward end thereof. The windlass 62 is preferably driven by a worm gear 64 with which a hand-actuated worm 66 is connected so that by turning a hand crank 68, the cable 60 may be wound on the windlass 62 to exert pull on the pulley 56 and flexible members 50 so as to extend the toggles and elevate the frame 20. In order to lock each toggle in its elevated position, a ring 70 is mounted adjacent the upper end thereof in such a manner that as the knees of the toggle are advanced toward one another, as illustrated in Figure 3, the ring 70 will descend about the upper pair of links 38 and 40 and into contact with stops 71 carried by links 38 and 40 to prevent the collapse of the toggle. Obviously, in lowering the frame 20, the rings 70 must be elevated out of engagement with the links 38 and 40 of the toggles so that upon rotating the windlass in a direction to unwind the cable 60 therefrom, the rings 70 will not interfere with the lowering of the frame 20.

In order to hold a load on the frame 20 between the wheel pockets 24, a bar 72 is provided adjacent opposite ends with openings 74 for the reception of the upwardly extending studs 26 so that when a load such as a boat is in place in the frame 20 between the abutments, the bar 72 will engage the upper edges of the gunwales of the boat to secure it in place. To this end, the studs 26 are provided with wing nuts which may be used to clamp the bar 72 in position.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A vehicle wheel suspension comprising ground wheels mounted to rotate about a common axis, arms carried by the ground wheels for movement in vertical arcuate paths concentric about the common axis, a vehicle frame pivotally connected to the arms remote from the ground wheels, toggles carried by the arms and operatively connected to the vehicle frame for raising or lowering the vehicle frame and moving the arms in their vertical arcuate paths, means carried by the vehicle frame and operatively connected to the toggles for operating said toggles and raising or lowering the vehicle, and rings carried by the toggles for automatically descending into contraction preventing relation to said toggles when the vehicle attains its maximum elevated position above the ground wheels.

2. A vehicle wheel suspension comprising ground wheels mounted to rotate about a common axis, arms carried by the ground wheels for movement in vertical arcuate paths concentric about the common axis, a vehicle frame pivotally connected to the arms remote from the ground wheels, toggles of the parallelogram type carried by the arms adjacent the ground wheels and operatively connected to the vehicle frame remote from the pivotal connection of the vehicle frame to the arms, extensible means connected to the toggles and extending between the mid-portions thereof for actuating said toggles and raising the vehicle frame relative to the ground wheel, loops carried by the toggles and adapted to move downwardly thereon as the toggles are being operated to elevate the frame, and said loops engaging opposite links of the toggles and preventing collapse of the toggles.

References Cited in the file of this patent

UNITED STATES PATENTS

| | | |
|---|---|---|
| 1,729,954 | Lute | Oct. 1, 1929 |
| 2,487,701 | Getz | Nov. 8, 1949 |
| 2,495,449 | Francis | Jan. 24, 1950 |
| 2,506,699 | Byrd | May 9, 1950 |
| 2,513,855 | Fogwell | July 4, 1950 |
| 2,540,100 | Coeur | Feb. 6, 1951 |
| 2,560,625 | Boggs | July 17, 1951 |
| 2,577,246 | Hill | Dec. 4, 1951 |